United States Patent
Greene et al.

(10) Patent No.: US 10,706,848 B1
(45) Date of Patent: Jul. 7, 2020

(54) ANOMALY DETECTION FOR VOICE CONTROLLED DEVICES

(71) Applicant: Amazon Technologies, Inc., Seattle, WA (US)

(72) Inventors: Christopher Wiswall Greene, Seattle, WA (US); Krishnamurthy Ganesan, Redmond, WA (US); Kunal Chandha, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 131 days.

(21) Appl. No.: 15/968,584

(22) Filed: May 1, 2018

(51) Int. Cl.
| | | |
|---|---|---|
| *G10L 15/00* | (2013.01) | |
| *G10L 15/22* | (2006.01) | |
| *G10L 15/06* | (2013.01) | |
| *G10L 15/30* | (2013.01) | |
| *G10L 15/18* | (2013.01) | |
| *G06N 20/00* | (2019.01) | |
| *G10L 15/08* | (2006.01) | |

(52) U.S. Cl.
CPC .............. *G10L 15/22* (2013.01); *G06N 20/00* (2019.01); *G10L 15/063* (2013.01); *G10L 15/1815* (2013.01); *G10L 15/30* (2013.01); *G10L 2015/088* (2013.01)

(58) Field of Classification Search
CPC .............. G06F 16/338; G06F 16/9535; G06F 16/2465; G06F 21/31; G06F 21/32; G06F 21/6218; G06F 16/3334; G06F 16/48; G06F 17/218; G10L 15/26; G10L 17/04; G10L 15/02; G10L 25/78
See application file for complete search history.

(56) References Cited

U.S. PATENT DOCUMENTS

| | | | | |
|---|---|---|---|---|
| 9,460,722 B2* | 10/2016 | Sidi | ......................... | G10L 17/02 |
| 9,881,617 B2* | 1/2018 | Sidi | ......................... | G10L 17/02 |
| 10,109,280 B2* | 10/2018 | Sidi | ......................... | G10L 17/02 |
| 2003/0154072 A1* | 8/2003 | Young | ..................... | H04M 3/51 |
| | | | | 704/9 |
| 2007/0083374 A1* | 4/2007 | Bates | .................... | G10L 15/197 |
| | | | | 704/257 |
| 2015/0025887 A1* | 1/2015 | Sidi | ......................... | G10L 17/02 |
| | | | | 704/245 |
| 2017/0053653 A1* | 2/2017 | Sidi | ......................... | G10L 17/02 |
| 2018/0158464 A1* | 6/2018 | Sidi | ......................... | G10L 17/02 |

FOREIGN PATENT DOCUMENTS

WO    WO-2015196063 A1 * 12/2015 ............... G06F 3/16

* cited by examiner

*Primary Examiner* — Edgar X Guerra-Erazo
(74) *Attorney, Agent, or Firm* — Lowenstein Sandler LLP

(57) ABSTRACT

A processing device receives a multi-dimensional input associated with audio data representing an utterance received by a speech-detection device, the multi-dimensional input comprising a speaker identifier (ID) of a speaker of the utterance and a device ID of the speech-detection device. The processing device processes the multi-dimensional input using a first machine learning model associated with at least one of the device ID or the speaker ID to determine a first anomaly rating for the utterance. The processing device determines that the first anomaly rating is above a first anomaly threshold. The processing device determines that the utterance is classified as an anomaly and performs a remedial action.

20 Claims, 11 Drawing Sheets

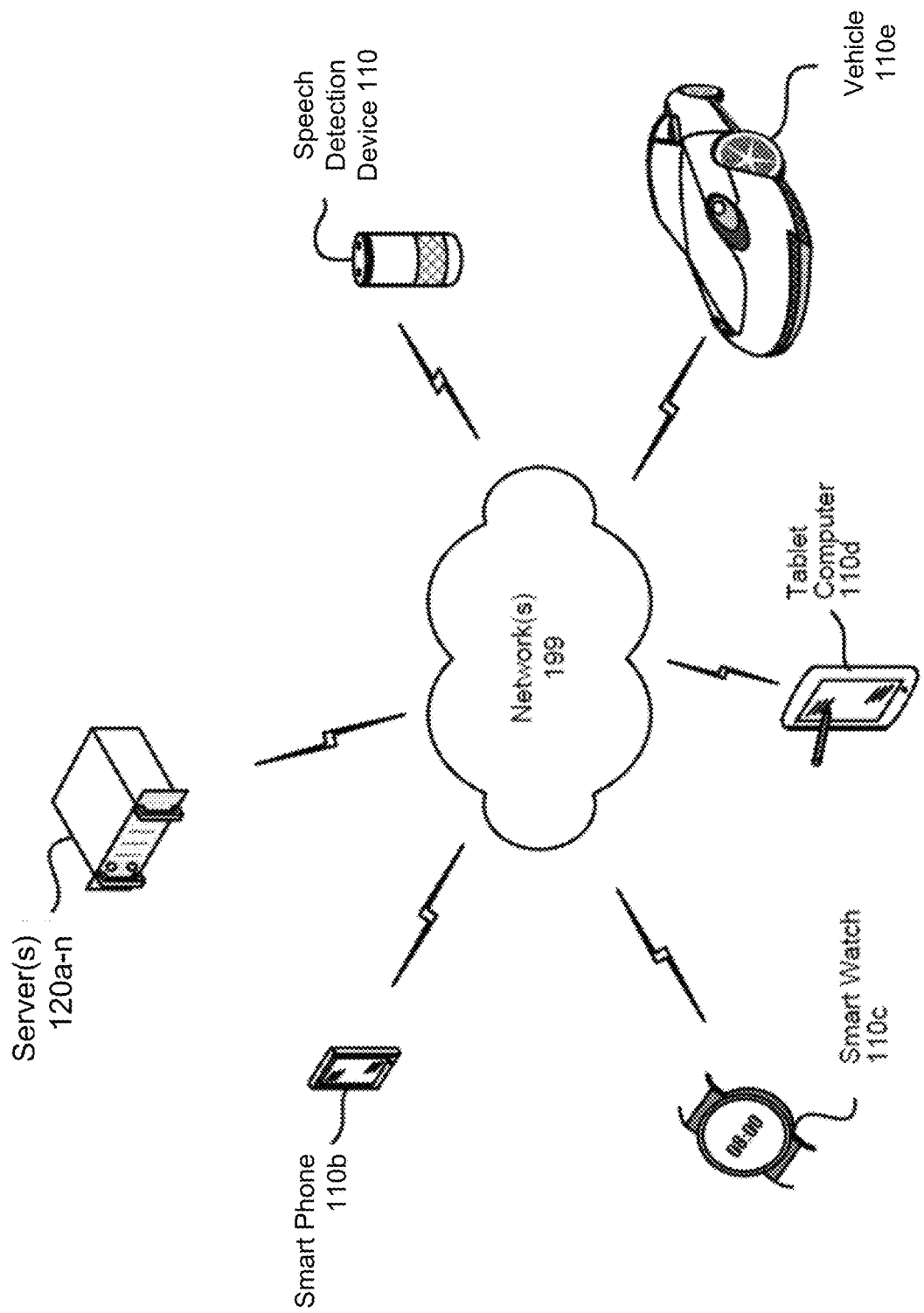

ANOMALY DETECTION FOR VOICE CONTROLLED DEVICES

RELATED APPLICATIONS

This application is related to co-pending U.S. patent application No., to be assigned, entitled "Resource Scheduling with Voice Controlled Devices," filed concurrently.

BACKGROUND

Homes and businesses are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. Another way to interact with computing devices is through natural language input such as speech. Some computing devices include a voice user interface (VUI) that enables a user to interact with the computing devices using speech.

BRIEF DESCRIPTION OF DRAWINGS

For a more complete understanding of the present disclosure, reference is now made to the following description taken in conjunction with the accompanying drawings.

FIG. 11 illustrates an example of a computer network for use with the speech processing system.

DETAILED DESCRIPTION

Figure 1:
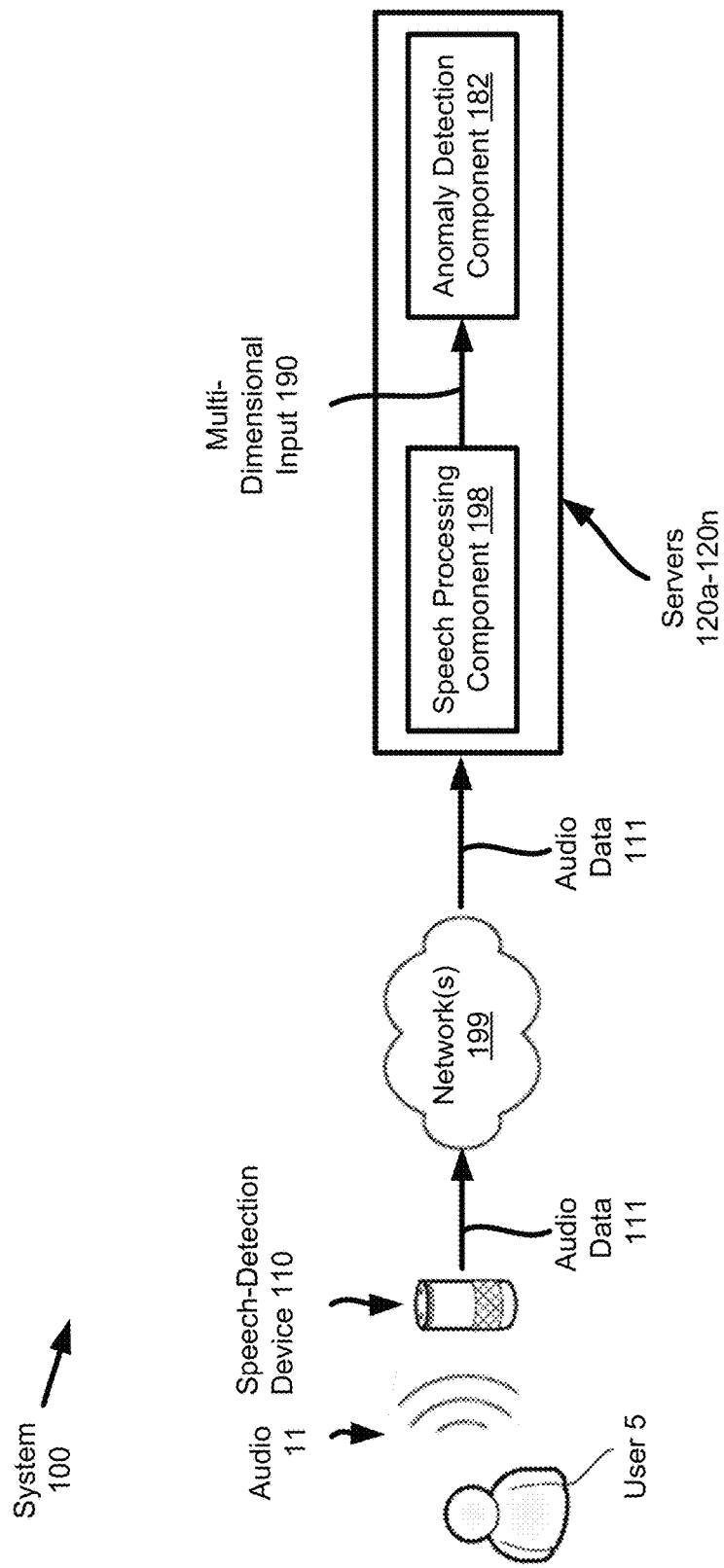
FIG. 1 illustrates a system configured to perform anomaly detection using audio data from a speech-detection device according to embodiments of the present disclosure.

Embodiments described herein are directed to an anomaly detection component for a speech processing system that includes a natural language user interface (e.g., such as a VUI). VUIs receive voice inputs and perform operations based on those voice inputs. Speech-detection devices (e.g., such as the Amazon Echo, Google Home, Apple HomePod, etc.) are increasingly used by businesses and organizations. For example, such speech-detection devices may be used in conference rooms to provide a VUI for joining conference calls, controlling lights, and so on. In another example, hotels may stock hotel rooms with speech-detection devices to enable guests to, for example, control lighting and/or electronics in the hotel room via a VUI. In another example, stadiums may include speech-detection devices. Businesses and organizations often have more stringent security policies than home users to safeguard confidential and/or sensitive information of the business or organization.

Speech-detection devices, including those used by businesses and organizations, are subject to theft. In an example, a speech-detection device for a meeting room may have access to join conference calls of a company. Accordingly, a thief of the speech-detection device may gain access to company conference calls through the speech-detection device. Additionally, speech-detection devices may control devices belonging to an organization or individual, and may be linked to paid services to which the organization or individual subscribes.

Embodiments described herein provide increased security for speech-detection devices by implementing an anomaly detection component of a speech processing system. The anomaly detection component generates machine learning models on an organization, user, device and/or other basis. The anomaly detection component may then process new audio data representing new utterances (e.g., new voice commands) received from a speech-detection device using one or more machine learning models. The machine learning models may identify whether the new utterance constitutes anomalous behavior, and may cause the speech processing system to take remedial action if anomalous behavior is detected. Such remedial action may include generating a notification for an administrator, locking the speech-detection device, disabling one or more features of the speech-detection device, and so on. Accordingly, the security associated with speech-detection devices, speech processing systems and VUIs may be improved in embodiments.

Separate machine learning models may be generated for each speech-detection device. Accordingly, each speech-detection device may have a machine learning model that models standard interactions with one or more users of that particular speech-detection device. New interactions that deviate from the standard interactions may be flagged as anomalies. What constitutes an anomaly may differ between devices based on the machine learning models generated for those devices and past inputs that have been used to generate the machine learning models.

For example, a speech-detection device may be a stationary device, and previous inputs that were used to generate a device machine learning model for the speech-detection device may all include particular location metadata. If the speech-detection device is moved, then a new input based on new audio data representing a new utterance may be associated with a different location. The different location may cause the new input to be classified as an anomaly. The different location may suggest, for example, that the speech-detection device has been stolen.

In another example, a speech-detection device may be located in an office that has office hours from 9 AM-5 PM, and a device machine learning model may have been generated for the speech-detection device based on inputs that all have a timestamp within the 9 AM-5 PM office hours. Moreover, the speech-detection device may have been used by a set of users who are employees of the office. If a new input based on new audio data representing a new utterance is received at 11 PM from a user who is not within the set of users who are employees of the office, this may cause the new input to be classified as an anomaly.

Separate machine learning models may also be generated for each user. Accordingly, each user may have a machine learning model that models standard interactions with one or more speech-detection devices. New interactions that deviate from the standard interactions may be flagged as anomalies. What constitutes an anomaly may differ between users based on the machine learning models generated for those users and past inputs that have been used to generate the machine learning models.

In an example, a user may generally use speech-detection devices within the hours of 9 AM-5 PM. Additionally, the user may have only used a particular set of services in the past. A speaker machine learning model may have been generated for the user based on past interactions of that user with the speech-detection devices. If a new input based on new audio data representing a new utterance is received at 11 PM from the user, and that new input indicates an intent to use a new service that is not within the particular set of services that the user has previously used, this may cause the new input to be classified as an anomaly.

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications. Speech processing may be used by computers, hand-held devices, telephone computer systems, kiosks, and a wide variety of other devices to improve human-computer interactions.

Automatic speech recognition (ASR) is a field of computer science, artificial intelligence, and linguistics concerned with transforming audio data associated with speech into text data representative of that speech. Natural language understanding (NLU) is a field of computer science, artificial intelligence, and linguistics concerned with enabling computers to derive meaning from text input containing natural language. ASR and NLU may be used together as part of a speech processing system.

FIG. 1 shows a system 100 configured to perform operations using audio data, in accordance with some embodiments of the present disclosure. As shown in FIG. 1, a speech-detection device 110 and servers 120a-n may be in communication over one or more networks 199. The servers 120a-n (which may be one or more different physical devices) may be capable of performing traditional speech processing (e.g., ASR, NLU, command processing, etc.) as well as other operations as described herein. One or more of the servers 120a-n may include a speech processing component 198 and an anomaly detection component 182, both of which are described in greater detail below with reference to FIGS. 2-3. A single server 120a may perform all speech processing or multiple servers 120a-n may combine to perform all speech processing. Further, the servers 120a-n may execute certain commands, such as answering spoken utterances of users 5, performing actions requested by users 5, and operating other devices (e.g., light switches, appliances, etc.). In some embodiments, servers 120a-n include a first server 120a or set of servers that perform speech processing, a second server 120b or set of servers that include one or more command processors, through an nth server 120n or set of servers that include one or more components that each provide distinct functionality (e.g., that provide a distinct service such as the anomaly detection service provided by anomaly detection component 182). Alternatively, a single server may include both a speech processing component 198 and one or more additional components.

A speech-detection device 110 may be a device that captures audio 11 including a spoken utterance of a user 5 via a microphone or microphone array of the speech-detection device 110. The speech-detection device 110 may be, for example, a dedicated speech-detection device that includes a VUI but lacks other user interfaces such as a graphical user interface (GUI). The speech-detection device 110 may also be a device such as a mobile phone, tablet computer, laptop computer, desktop computer, etc. that includes a speech-detection application that causes the device to function as a speech-detection device. The audio 11 may include a voice activation command for the speech-detection device 110, which may place the speech-detection device 110 into a listening mode. The audio 11 may additionally include an additional command, a question and/or other utterance. While in the listening mode, the speech-detection device 110 activates one or more microphones that captures the audio 11 comprising the additional command, question and/or other utterance and sends the captured audio to the one or more servers 120a-n.

Processing logic of the one or more servers 120a-n receives the captured audio data 111 from the speech-detection device 110. Speech processing 198 converts the audio data 111 to text data. The speech processing component 198 determines intent data and associated entity data from the text data. The speech-processing component 198 may additionally determine a component that may perform an operation associated with the intent data and entity data (e.g., to satisfy an intent represented by the intent data and/or the entity data). The speech-processing component 198 may then provide the intent data, entity data and/or an identifier (e.g., component identifier (ID)) of the determined component to anomaly detection component 182. The anomaly detection component may additionally receive other data such as metadata from the audio data 111 (e.g., which may include a device ID such as a device serial number (DSN), a timestamp, location information (e.g., a global positioning system (GPS) location of the speech-detection device 110, an internet protocol (IP) address of a network to which the speech-detection device 110 is connected, and so on), etc. Other data that may be received includes a speaker ID of the user 5 and/or an account ID of a user account associated with the speech-detection device 110. Other types of data may also be received by the anomaly detection component 182.

The anomaly detection component 182 receives a multi-dimensional input 190 comprising multiple different types of data. For example, the multi-dimensional input may include the device ID, speaker ID, account ID, timestamp, intent data, entity data, component ID, location information (e.g., GPS location, IP address, location based on position in a wireless mesh network, etc.), and/or other data. The anomaly detection component 182 then uses one or more machine learning profile to process the multi-dimensional input 190. The machine learning profile(s) then output an anomaly rating for the audio data 111 and utterance represented by the audio data 111. If the anomaly rating is above an anomaly threshold, then an anomaly may be detected, and one or more remedial actions may be performed. For example, speech-detection device 110 may be locked. This may include disabling one or more features of the speech-detection device 110.

Figure 2:
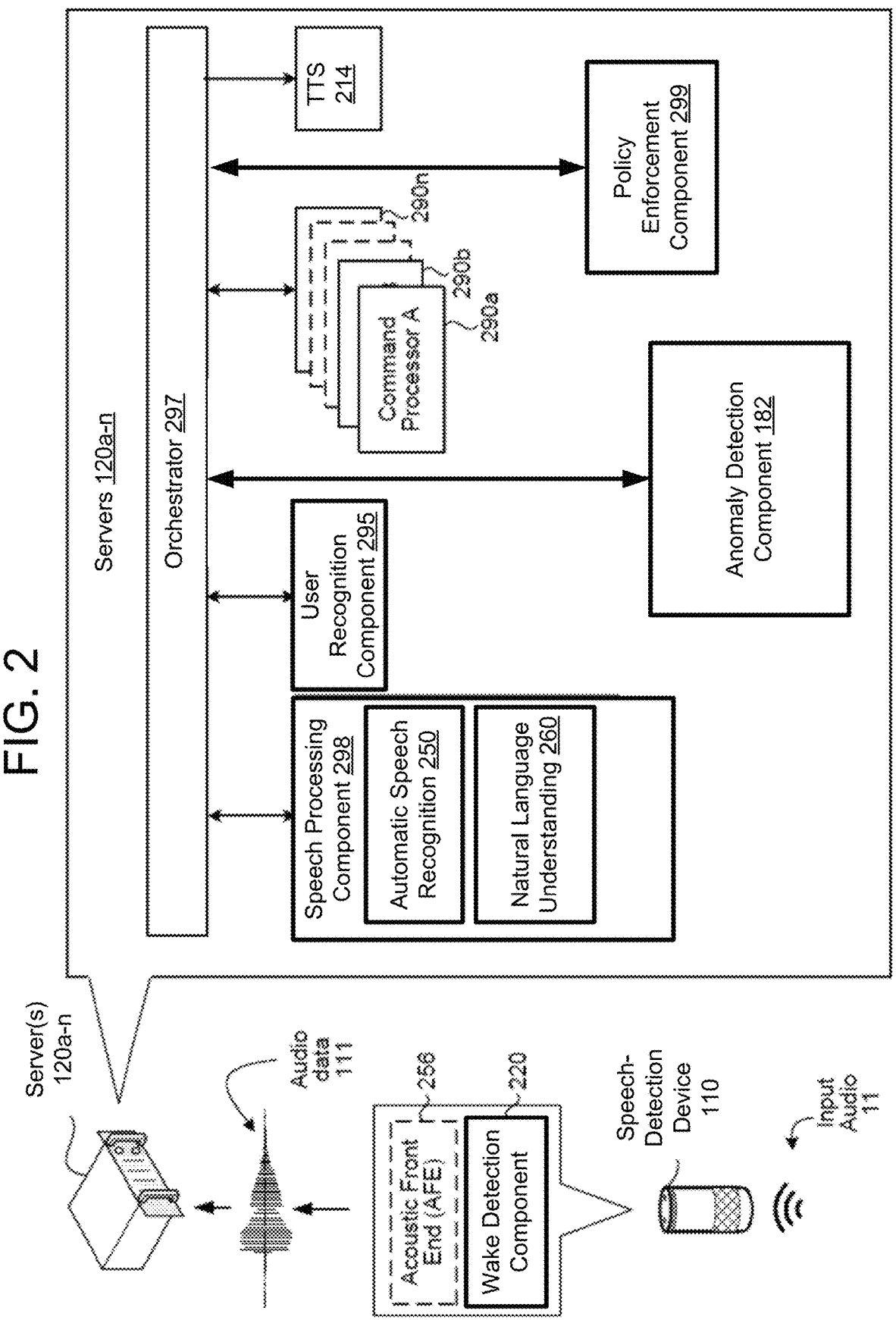
FIG. 2 is a diagram of components of a speech processing system according to embodiments of the present disclosure.
Figure 3:
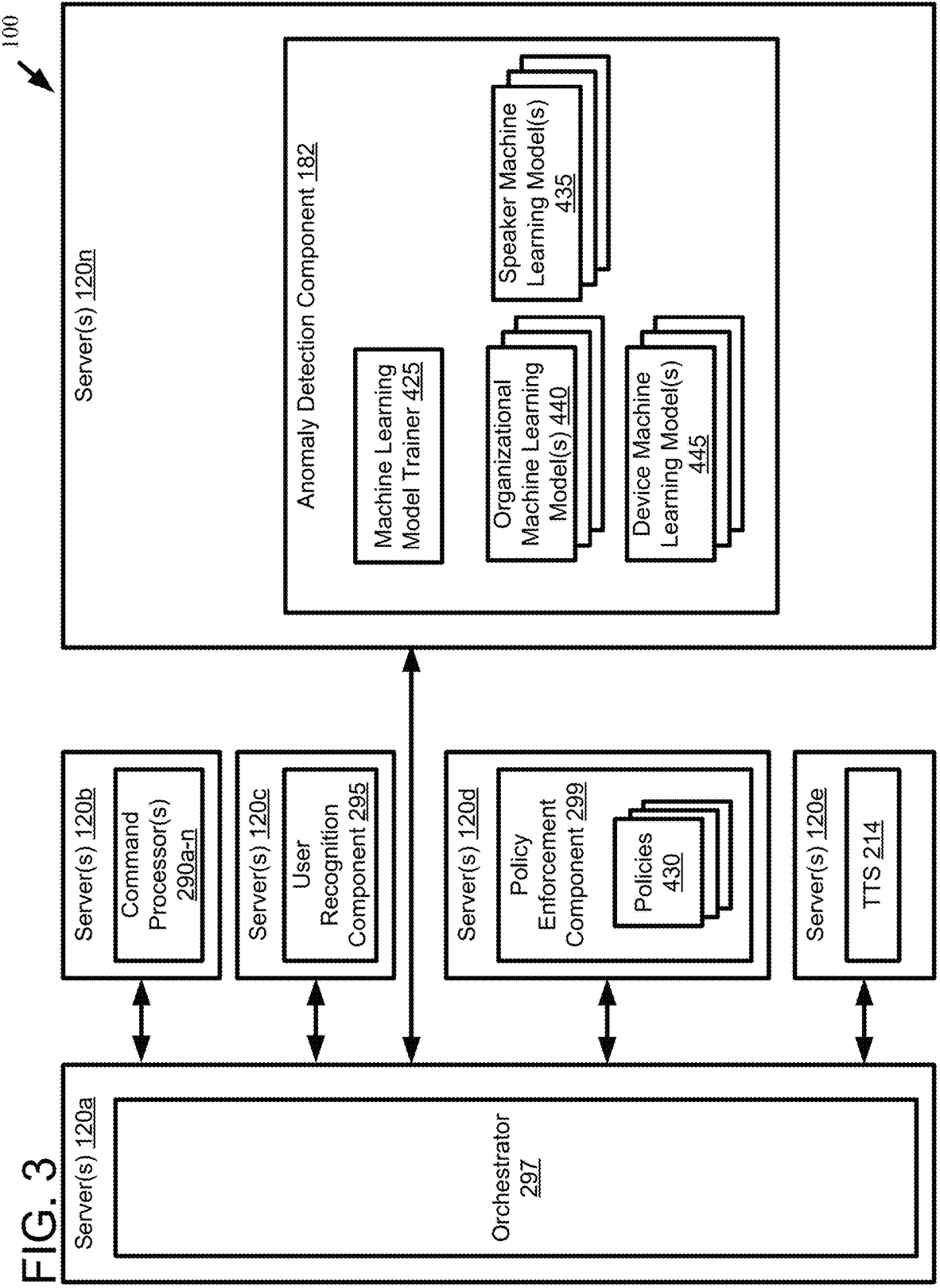
FIG. 3 is diagram of an anomaly detection component for a speech processing system according to embodiments of the present disclosure.

The system 100 may operate using various speech processing components as described in FIGS. 2-3. The various components illustrated may be located on the same and/or different physical devices. Communication between various components illustrated in FIGS. 2-3 may occur directly and/or across a network(s) 199.

Referring to FIG. 2, an audio capture component, such as a microphone (or array of microphones) of the speech-detection device 110, captures input audio 11 corresponding to a spoken utterance. The speech-detection device 110, using a wakeword detection component 220, processes audio data corresponding to the input audio 11 to determine if a keyword (such as a wakeword) is detected in the audio data. Following detection of a wakeword, the speech-detection device 110 sends audio data 111, corresponding to the utterance, to a server(s) 120*a-n* for processing. The audio data 111 may be output from an acoustic front end (AFE) 256 located on the speech-detection device 110 prior to transmission, or the audio data 111 may be in a different form for processing by a remote AFE.

The wakeword detection component 220 works in conjunction with other components of the speech-detection device 110, for example a microphone, to detect keywords in audio data corresponding to the input audio 11. For example, the speech-detection device 110 may convert input audio 11 into audio data, and process the audio data with the wakeword detection component 220 to determine whether speech is detected, and if so, if the audio data comprising speech matches an audio signature and/or model corresponding to a particular keyword.

Once speech is detected in the audio data, the speech-detection device 110 may use the wakeword detection component 220 to perform wakeword detection to determine when a user intends to speak a command to the speech-detection device 110. This process may also be referred to as keyword detection, with the wakeword being a specific example of a keyword. Specifically, keyword detection is typically performed without performing linguistic analysis, textual analysis, and/or semantic analysis. Instead, audio data is analyzed to determine if specific characteristics of the audio data match preconfigured acoustic waveforms, audio signatures, and/or other data to determine if the incoming audio data "matches" stored audio data corresponding to a keyword. Other techniques for wakeword detection, such as those known in the art, may also be used.

Once the wakeword is detected in the audio data, the speech-detection device 110 may "wake" and begin transmitting audio data 111 corresponding to input audio 11 to server 120*a* for speech processing (e.g., for purposes of executing a command in the speech). The audio data 111 may include data corresponding to the wakeword, and/or the portion of the audio data corresponding to the wakeword may be removed by the speech-detection device 110 prior to sending the audio data 111 to the server(s) 120*a-n*. The audio data 111 may additionally include a voice command, question and/or other utterance.

Upon receipt by the server 120*a-n*, an orchestrator component 297 sends the audio data 111 to a speech processing component 298, and namely an ASR component 250 of the speech processing component 298. The ASR component 250 transcribes the audio data 111 into text data representing words of speech contained in the audio data 111. The text data may then be used by other components for various purposes, such as executing system commands, inputting data, etc. A spoken utterance in the audio data 111 is input to logic configured to perform ASR, which then interprets the spoken utterance based on a similarity between the spoken utterance and pre-established language models stored in an ASR model knowledgebase. For example, the ASR component 250 may compare the audio data 111 with models for sounds (e.g., subword units and/or phonemes) and sequences of sounds to identify words that match the sequence of sounds spoken in the utterance of the audio data 111.

The different ways a spoken utterance may be interpreted may each be assigned a respective probability/confidence score representing a likelihood that a particular set of words matches those spoken in the utterance. The confidence score may be based on a number of factors including, for example, a similarity of the sound in the spoken utterance to models for language sounds, and a likelihood that a particular word that matches the sound would be included in the sentence at the specific location (e.g., using a language model). Thus, each potential textual interpretation of the spoken utterance (i.e., hypothesis) may be associated with a confidence score. Based on the considered factors and the assigned confidence score, the ASR component 250 outputs the most likely text data corresponding to the audio data 111. The ASR component 250 may also output multiple hypotheses in the form of a lattice and/or an N-best list with each hypothesis corresponding to a confidence score and/or other score (e.g., such as probability scores, etc.).

The ASR component 250 may include an AFE and a speech recognition engine. The AFE transforms audio data 111 into data for processing by the speech recognition engine. The speech recognition engine compares the speech recognition data with acoustic models, language models, and other data models and information for recognizing the speech conveyed in the audio data 111. The AFE may reduce noise in the audio data 111 and divide the digitized audio data 111 into frames representing time intervals for which the AFE determines a number of values (i.e., features) representing qualities of the audio data 111, along with a set of those values (i.e., a feature vector and/or audio feature vector) representing features/qualities of the audio data 111 within each frame. Many different features may be determined, as known in the art, and each feature represents some quality of the audio data 111 that may be useful for ASR processing. A number of approaches may be used by the AFE to process the audio data 111, such as mel-frequency cepstral coefficients (MFCCs), perceptual linear predictive (PLP) techniques, neural network feature vector techniques, linear discriminant analysis, semi-tied covariance matrices, and/or other approaches known to those skilled in the art.

The speech recognition engine attempts to match received feature vectors to language phonemes and words as known in the stored acoustic models and language models. The speech recognition engine computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving a likelihood that the ASR component 250 will output text data representing speech that makes sense grammatically.

Following ASR processing, the ASR results (i.e., text data representing speech) may be sent to the orchestrator 297 and/or other processing components, which may be local to the device performing ASR and/or distributed across the network(s) 199. For example, ASR results in the form of a single textual representation of the speech, an N-best list including multiple hypotheses and respective scores, lattice, etc. may be sent from the ASR component 250 to an NLU component 260 directly and/or indirectly through the orchestrator component 297.

The device performing NLU processing (e.g., the server 120a) may include various components, including potentially dedicated processor(s), memory, storage, etc. The device performing NLU processing may include a dedicated NLU component 260, which may include a named entity recognition (NER) component that determines entities from received text of utterances and an intent classification (IC) component that determines user intent from text of utterances. The device performing NLU processing may additionally include NLU storage, and a knowledgebase (not illustrated). The knowledgebase is a database and/or other information storage that may include information about entities that may be used in resolving spoken utterances. The NLU component 260 may also utilize gazetteer information stored in an entity library storage. The knowledgebase and/or gazetteer information may be used for entity resolution, for example matching ASR results with different entities (e.g., song titles, contact names, etc.). Gazetteers may be linked to users (e.g., a particular gazetteer may be associated with a specific user's music collection), may be linked to certain domains (e.g., shopping), and/or may be organized in a variety of other ways. Domain, as used herein, may refer to a category of content, such as music, videos, weather, etc. Each domain may be associated with a particular component. For example, a music component may be associated with a music domain, a video component may be associated with a video domain, a weather component may be associated with a weather domain, and so on.

The NLU component 260 takes text data (e.g., output from the ASR component 250) and attempts to make a semantic interpretation of the text data. That is, the NLU component 260 determines the meaning behind the text data based on the individual words and then implements that meaning. The NLU component 260 interprets a text string to derive an intent data and/or a desired action from the user as well as the pertinent pieces of information in the text data that allow a device (e.g., the speech-detection device 110, the server(s) 120a-n, etc.) to complete that action (e.g., entity data associated with the intent data). For example, if a spoken utterance is processed using the ASR component 250, which outputs the text data "play Katy Perry", the NLU component 260 may determine the user intended to activate a music component in order for the music component to play music by Katy Perry.

The NLU component 260 may be configured to parse and tag to annotate text data as part of NLU processing. For example, for the text data "play Katy Perry," the NLU component 260 may tag "play" as a command (e.g., to execute a music component to play music) and may tag "artist: Katy Perry" as a specific entity and target of the command.

To correctly perform NLU processing of an utterance, the NLU component 260 may be configured to determine a "domain" of the utterance so as to determine and narrow down which components offered by an endpoint device (e.g., the server(s) 120a-n, the speech-detection device 110, etc.) may be relevant. For example, an endpoint device may offer components relating to interactions with a telephone component, a contact list component, a calendar/scheduling component, a music player component, a verification component, a knowledgebase component, a news component, a video component, etc. Words in text data may implicate more than one component, and some components may be functionally linked (e.g., both a telephone component and a calendar component may utilize data from the contact list).

The NLU component 260 receives an utterance in the form of ASR results and attempts to identify relevant grammars and lexical information that may be used to construe meaning. To do so, the NLU component 260 may begin by identifying potential domains that may relate to the received utterance. The NLU component 260 may have access to a database of domains associated with specific devices. For example, the speech-detection device 110 may be associated with domains for music, telephony, calendaring, contact lists, knowledgebase, skills, videos, and device-specific communications. In addition, the entity library may include database entries about specific components on a specific device, either indexed by device ID, user ID (e.g., speaker ID), household ID, organization ID and/or some other indicator.

A domain may represent a discrete set of activities having a common theme, such as "news", "music", "skills", "videos," etc. As such, each domain may be associated with a particular language model and/or grammar database, a particular set of intents/actions, and/or a particular personalized lexicon. A user's music-domain lexical information might include album titles, artist names, and song names, for example, whereas a user's contact-list lexical information might include the names of contacts. Since every user's music collection and contact list is presumably different, this personalized information improves entity resolution.

An utterance may be processed applying the rules, models, and information applicable to each identified domain. For example, if an utterance potentially implicates both news and music, the utterance may be NLU processed using the grammar models and lexical information for news, and may also be processed using the grammar models and lexical information for music. The responses to the spoken utterance produced by each set of models is scored, with the overall highest ranked result from all applied domains being ordinarily selected to be the correct result.

The NLU component 260 may parse the utterance to determine an intent(s) for each identified domain, where the intent(s) corresponds to the action to be performed that is responsive to the spoken utterance. Each domain is associated with a database of words linked to intents. For example, a music intent database may link words and phrases such as "quiet," "volume off," and "mute" to a "mute" intent. The NLU component 260 identifies potential intents for each identified domain by comparing words in the utterance to the words and phrases in an intents database.

In order to generate a particular interpreted response, the NLU component 260 applies the grammar models and lexical information associated with the respective domain. Each grammar model includes the names of entities (i.e., nouns) commonly found in speech about the particular domain (i.e., generic terms), whereas the lexical information from the gazetteer is personalized to the user and/or the device. For instance, a grammar model associated with a music domain may include a database of music content available to a particular user account.

The intent data identified by the NLU component 260 are linked to domain-specific grammar frameworks (included in grammar models) with "slots" or "fields" to be filled. For example, if "play music" is an identified intent, a grammar framework(s) may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NLU component 260 may parse the spoken utterance to identify words as subject, object, verb, preposition, etc., based on grammar rules and models, prior to recognizing named entities. The identified verb may be used by the NLU component 260 to identify intent, which is then used by the NLU component 260 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NLU component 260 then searches the corresponding fields in the domain-specific and personalized lexicon(s), attempting to match words and phrases in the utterance tagged as a grammatical object and/or object modifier with those identified in the database(s).

In an example, an utterance of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the NLU component 260 will determine corresponds to the "play music" intent. No determination has been made as to the meaning of "mother's little helper" and "the rolling stones," but based on grammar rules and models, it is determined that these phrases relate to the grammatical object of the spoken utterance.

The frameworks linked to the intent data are then used to determine what database fields should be searched to determine the meaning of these phrases, such as searching a user's gazetteer for similarity with the framework slots. So a framework for a "play music" intent data might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot/field using gazetteer information, the NLU component 260 may search the database of generic words associated with the domain. For instance, if the utterance was "play songs by the rolling stones," after failing to determine an album name or song name called "songs" by "the rolling stones," the NLU component 260 may search the domain vocabulary for the word "songs."

The results of NLU processing may be tagged to attribute meaning to the utterance. For example, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG. The results from the NLU component 260 may therefore include intent data, entity data and/or a component ID of a component (or a command processor associated with a component) that can satisfy the intent represented by the intent data and/or entity data. In some embodiments, the intent data is associated with a specific component and/or command processor 290a-n.

The output from the ASR component 250 may also be sent to a user recognition component 295 either directly and/or indirectly through the orchestrator component 297. Alternatively, the user recognition component 295 may be implemented as part of the ASR component 250. The user recognition component 295 performs user recognition using the audio data 111, and optionally the ASR component output. The user recognition component 295 may include a scoring component that determines respective scores indicating whether the input utterance in the audio data 111 was spoken by particular users. The user recognition component 295 may also include a confidence component that determines an overall confidence as to the accuracy of user recognition operations. User recognition may involve comparing speech characteristics in the audio data 111 to stored speech characteristics of users. User recognition may also involve comparing biometric data (e.g., fingerprint data, iris data, etc.) received by the user recognition component 295 (e.g., from speech-detection device 110) to stored biometric data of users. User recognition may further involve comparing image data including a representation of a feature of a user (e.g., as received from a camera of the speech-detection device 110) with stored image data including representations of features of users. It should be appreciated that other kinds of user recognition processes, including those known in the art, may be used.

Output from the NLU processing, which may include tagged text data, commands, intent data, entity data, a component ID, etc., and output of the user recognition component 295 (e.g., a unique ID of a user) may be sent to a command processor 290a-n, which may be located on a same and/or separate server 120a-n as part of the system 100. The system 100 may include more than one command processor 290a-n, and the command processor(s) 290a-n may be determined based on the NLU output. For example, if the NLU output includes a command to play music, the command processor 290a-n selected may correspond to a music playing application and/or music component, such as one located on the speech-detection device 110 and/or in a music playing appliance. In another example, if the NLU output includes a command to read an article about a topic, the command processor 290a-n selected may correspond to a news domain and/or news component. Many such command processors 290a-n may be available to the system 100 depending on the various applications that may be invoked. In some embodiments, a music command processor may be associated with a music component, a news command processor may be associated with a news component, a skills command processor may be associated with a skills component, a knowledgebase command processor may be associated with a knowledgebase component, a video command processor may be associated with a video component, and so on.

Output from the NLU component 260 (and optionally the user recognition component 295) may be sent to a command processor(s) 290a-n/skill either directly and/or indirectly via the orchestrator component 297. A "skill" may correspond to a domain and may be software running on a server and/or device akin to an application. That is, a skill may enable a server to execute specific functionality in order to provide data and/or produce some other output called for by a user. The system may be configured with more than one skill. For example a weather component skill may enable a server to execute a command with respect to a weather component server, a car component skill may enable a server to execute a command with respect to a taxi component server, an order pizza skill may enable a server to execute a command with respect to a restaurant server, a verification skill may enable a server to execute a command with respect to a verification component, etc. A skills command processor may include logic to select an appropriate skill for handling a received intent data and entity data.

A command processor 290a-n may output text that is to be spoken to a user via speech-detection device 110. Alternatively, a command processor 290a-n may receive text from, for example, a particular component, where the text is to be spoken to a user via speech-detection device 110. The command processor 290a-n provides the text to a text to speech (TTS) engine 214, which converts the text into speech (e.g., into an audio file that contains a spoken version of the content of the text). This audio file may be, for example, a Moving Picture Experts Group Audio Layer III (MP3) audio file and/or other type of compressed or uncompressed audio file. The audio file is sent to the speech-detection device 110 and then played by the speech-detection device 110. In some embodiments, a link to the audio file (e.g., a universal resource locator (URL)) is sent to the speech-detection device, and the speech-detection device 110 accesses the link to receive the audio file.

Output from the NLU component 260 (and optionally the user recognition component 295) may be sent to an anomaly detection component 182. The anomaly detection component 182 may additionally receive metadata associated with the audio data 111, which may include a device ID of speech-detection device 110, a timestamp indicating when the input audio 11 was received and/or when the audio data 111 was generated, and so on. The speech-detection device 110 may additionally include one or more biometric sensors, such as a fingerprint reader, a retinal scanner, a video camera, and so on, which may collect biometric information including a user fingerprint, a user retinal map, an image of the user, and so on. Such biometric data may be sent by speech-detection device 110 to servers 120a-n, and may be received by anomaly detection component 182. Additionally, speech-detection device 110 may include a GPS receiver that is usable to determine a location of the speech-detection device. Alternatively, or additionally, speech-detection device may obtain other location information, such as an IP address of a network to which the speech-detection device is connected. Another example of location information is a relative position of the speech-detection device 110 in a wireless mesh network such as a Zigbee network or Bluetooth Mesh network. For example, if devices in the wireless mesh network are generally stationary, then speech-detection device 110 may determine those devices that are in range of the speech-detection device. The list of those other devices may be used as a type of location information. If the list of other devices changes, then it may be determined that the speech-detection device has been moved. Any such location information may be sent to servers 120a-n, and may be received by anomaly detection component 182.

Anomaly detection component 182 receives a multi-dimensional input comprising any or all of the data items discussed above, and inputs the multi-dimensional input into one or more machine learning models. The multi-dimensional input may be received by anomaly detection component 182 before determined intent data and/or entity data are sent to a command processor 290a-n or another component for processing. The machine learning models may have been trained based on past multi-dimensional data points from a training dataset, which may be based on previous audio data received by servers 120a-n from the user 5 and/or speech-detection device 110 over a period of time (e.g., over a period of 60-90 days). In one embodiment, a first machine learning model is associated with user 5 (e.g., is associated with a speaker ID of the user) and a second machine learning model is associated with speech-detection device 110 (e.g., is associated with a device ID of the speech-detection device 110). Each of the machine learning models may output a result that indicates an anomaly rating. Anomaly ratings that are above an anomaly threshold may be identified as anomalies. If one or more anomalies are detected, the anomaly detection component 182 may send a notice to policy enforcement component 299.

Output from the NLU component 260 (and optionally the user recognition component 295) may be sent to a policy enforcement component 299 before it is sent to a command processor 290a-n. The policy enforcement component 299 may determine whether any restrictive use policies have been activated for the user 5 and/or for the speech-detection device 110. Restrictive user policies may limit the skills, components, actions, features, functions, etc. available to the speech-detection device 110 and/or to the user 5. For example, a speech-detection device 110 may be locked such that system 100 will not respond to the speech-detection device. In another example, a policy may prohibit the speech-detection device 110 from accessing one or more command processors 290a-n, skills and/or components. This may ensure that a stolen device is not usable to access sensitive information of an organization. In another example, a policy may blacklist a particular user. A blacklisted user may be unable to access some or all skills, components, actions, features, functions, etc., regardless of the speech-detection device that they use. If a requested action (e.g., combination of intent data and entity data) is not permitted in accordance with an activated policy, policy enforcement component 299 may generate a text message indicating that use of the speech-detection device 110 has been restricted and/or that user 5 should call customer service to reactivate the speech-detection device 110 and/or remove a policy. The text may be converted by TTS 214 to audio data, and may be sent to speech-detection device 110 for audio output.

The policy enforcement component 299 may additionally receive instructions to implement or activate a policy from anomaly detection component 182 in embodiments. Responsive to receipt of such an instruction, policy enforcement component 299 may assess next and/or previous data based on audio data 111 from speech detection device 110 and/or originating from user 5 to determine whether a requested action is permissible in view of the activated policy.

Policy enforcement component 299 may additionally receive an indication that an anomaly has been detected from anomaly detection component 182 in embodiments. Responsive to receipt of such an indication, policy enforcement component 299 may determine whether to activate a policy. Responsive to receipt of such an indication, policy enforcement component 182 may alternatively or additionally determine whether any active policy indicates one or more remedial actions to perform. Examples of remedial actions include generating a notification of a detected anomaly for an administrator, generating a warning to be output by speech-detection device 110, locking the speech-detection device 110, blacklisting user 5, disabling one or more features of speech-detection device 110 and/or activating one or more policies.

FIG. 3 is diagram of one example implementation of system 100 that includes an anomaly detection component 182 according to embodiments of the present disclosure. As shown, servers 120a-n are divided into servers 120a, 120b, 120c, 120d, 120e and 120n. Server 120a includes orchestrator 297, server 120b includes one or more command processors 190a-n, server 120c includes user recognition component 295, server 120d includes policy enforcement component 299, server 120e includes TTS component 214 and server 120n includes anomaly detection component 182. In other embodiments the various components may be divided across the servers in other arrangements, and more or fewer servers may be used. Additionally each of servers 120a, 120b, 120c, 120d, 120e and 120n may constitute multiple servers, such as a cluster of servers.

Orchestrator 297, command processors 290a-n, user recognition component 295, TTS component 214, policy enforcement component 299 and anomaly detection component 182 may communicate via networks 199 in embodiments. In one embodiment, anomaly detection component 182 includes a machine learning trainer 425. The machine learning trainer 425 may generate and train machine learning models to classify multi-dimensional inputs as anomalous behavior or typical behavior. As discussed above, the multi-dimensional inputs may include intent data, entity data, a device ID, a speaker ID, a component ID (or command processor ID), an account ID, a timestamp, biometric data (e.g., fingerprint, retinal scan, facial image, etc.), location information (e.g., GPS location, IP address, list of nearby devices, mesh network position information, etc.), and/or other data. Each multi-dimensional input may represent an interaction of a user with a speech-detection device.

The multi-dimensional inputs may be received as a training dataset that includes a collection of multiple user interactions with one or more speech detection device. Such multi-dimensional inputs may be added to a log as they are created, and the contents of the log may be used as the training dataset once it reaches a threshold size (e.g., with a threshold number of interactions) and/or has been logging interactions for a threshold amount of time (e.g., 30 days, 60 days, 90 days, etc.). The anomaly detection component may train multiple different types or classes of machine learning models. One type of machine learning model is a speaker machine learning model 435 that is trained to recognize usage patterns (e.g., behavioral patterns) of a particular user. The training dataset for training a speaker machine learning model 435 includes the multi-dimensional inputs associated with multiple interactions of a single user with one or more speech-detection devices.

Another type of machine learning model is a device machine learning model 445 that is trained to recognize usage patterns of a particular speech-detection device. The training dataset for training a device machine learning model 445 includes multi-dimensional inputs associated with multiple interactions of one or more users with a single speech detection device. Another type of machine learning model is an organizational machine learning model 440. An organizational machine learning model 440 is trained using multi-dimensional inputs associated with interactions with multiple users and/or multiple speech-detection devices belonging to or otherwise associated with an organization. The organizational machine learning model 440 may be trained to recognize abnormal interactions that differ from the patterns of interactions of multiple users of the organization with multiple speech-detection devices of the organization. For example, an organizational machine learning model 440 may be generated for a hotel for all speech-detection devices belonging to the hotel that are installed in hotel rooms. Accordingly, the same organizational machine learning model 440 may be applied across multiple speech-detection devices. Alternatively, or additionally, a separate device machine learning model 445 could be generated and used for each hotel room of the hotel.

Multiple different machine learning techniques may be used to generate the various machine learning models 435, 440, 445, including artificial neural networks (ANNs), recurrent neural networks (RNNs), deep learning, association rule learning, inductive logic programming, support vector machines, clustering, Bayesian networks, and so on. Machine learning model trainer 425 may generate multiple different organizational machine learning models 440, multiple different speaker machine learning models 435 and/or multiple different device machine learning models 445. For example, a separate device machine learning model 445 may be generated for each speech-detection device in service. Similarly, a separate speaker machine learning model 435 may be generated for each distinct user that interacts with any speech-detection device.

Machine learning model trainer 425 may reserve a portion of the training dataset to validate a trained machine learning model. If the trained machine learning model has an accuracy of greater than a threshold amount using the reserved portion of the training dataset, then the machine learning model may be implemented and used to check for anomalous behavior by processing multi-dimensional inputs associated with future interactions by one or more users with one or more speech-detection devices.

Once a device machine learning model 445 is generated for a speech-detection device, a multi-dimensional input may be generated for each new interaction of a user with that speech detection device. That multi-dimensional input may then be input into the appropriate device machine learning model 445, and may output an anomaly rating and/or an anomaly classification (e.g., an output indicating whether an utterance from a user constitutes an anomaly or not). If an anomaly is detected, the anomaly may be reported to policy enforcement component 299.

Once a speaker machine learning model 435 is generated for a user, a multi-dimensional input may be generated for each new interaction of the user with any speech detection device. That multi-dimensional input may then be input into the appropriate speaker machine learning model 435, and may output an anomaly rating and/or an anomaly classification (e.g., an output indicating whether an utterance from a user constitutes an anomaly or not). For example, if users always use a speech-detection device to join meetings between 9 AM-5 PM, and a new utterance to join a meeting at 11 PM is received, the new utterance may be classified as an anomaly. In another example, if a speech-detection device has always been used at a particular location and a new multi-dimensional input indicates that the speech-detection device is being used from a different location, then an anomaly may be detected. Such anomaly may indicate, for example, that the speech-detection device has been stolen. If an anomaly is detected, the anomaly may be reported to policy enforcement component 299.

A single multi-dimensional input associated with a single user interaction (e.g., associated with or based on an utterance of a user) may be processed using multiple machine learning models. For example, an appropriate speaker machine learning model 435 may process the multi-dimensional input and an appropriate device machine learning model 445 may also process the multi-dimensional input. Each machine learning model may provide any detected anomalies to the policy enforcement component 299.

Policy enforcement component 299 may have multiple policies 430. Policies 430 may be associated with particular organizations, particular speech-detection devices and/or particular users. Policies 430 may control one or more operations to perform when an anomaly or sequence of anomalies are detected. Policies 430 may be set by a user and/or an administrator. Policies 430 may be static policies that always perform the same operation when activated. Alternatively, policies 430 may be dynamic policies which may include internal logic that determines whether to perform remedial actions based on a current set of conditions. For example, dynamic policies may include if-then statements and/or Boolean logic.

In one embodiment, policy enforcement component 299 determines when to activate a static policy associated with a user or speech-detection device based on anomaly notifications from anomaly detection component 182. Once activated, the static policy may perform one or more remedial actions, such as placing a speech-detection device into a lockdown mode (e.g., restricting access of the speech-detection device to one or more functions, services, skills, components, etc.), generating a notification to be sent to a user account associated with the speech-detection device, generating a notification to be sent to an administrator, placing a user associated with the anomaly on a blacklist, and so on. One example policy 430 may generate a message asking a user to provide a password within a time limit. If the user fails to provide the password within the time limit, then the speech-detection device may be placed into the lockdown mode. Notifications of anomalous behavior may indicate a last known location of the speech-detection device in some embodiments. Users on the blacklist may be restricted by policy enforcement component 299 from accessing one or more services, skills, components, etc. In another embodiment, policy enforcement component 299 forwards anomaly notifications to appropriate dynamic policies 430, and the policies determine whether to perform remedial action as well as what remedial action to perform.

A user may remove a speech-detection device from a lockdown mode by selecting an unlock device option (e.g., in a web interface or application interface for controlling speech-detection devices) and/or by providing authentication credentials (e.g., such as a password, pin number, voice print, etc.). Once the speech-detection device 110 is removed from the lockdown mode, one or more features that were disabled for the speech-detection device 110 may be re-enabled. A user may remove themselves from a blacklist by engaging customer support and/or contacting an organization administrator. In some embodiments, policies 430 may include policies for removing devices from lockdown mode. Such policies may determine whether one or more unlock conditions are satisfied, and remove a lock device from the lockdown mode responsive to determining that the unlock conditions are satisfied. For example, a user may tap a mobile phone against the speech-detection device to unlock the speech-detection device, or a mobile phone may use near field communication (NFC) to send an unlock signal to a nearby locked speech-detection device, or a user may provide authentication credentials.

In some embodiments, a policy 430 may be applied to a speech-detection device after a threshold number of anomalies are detected for that speech-detection device. In other embodiments, a policy 430 may perform different remedial actions based on the number of anomalies that are detected for a speech-detection device. For example, a notice may be generated if a single anomaly is detected within a time period, and the speech-detection device may be placed into the lockdown mode if three anomalies are detected for the speech-detection device in the time period.

In some embodiments, when a new user interaction is detected a query is made to the policy enforcement component 299. The policy enforcement component 299 may then determine whether an active policy is associated with a user and/or speech-detection device associated with the new user interaction. If an active policy is associated with the new user interaction, then policy enforcement component 299 may determine whether the interaction violates any rules of the policy. For example, policy enforcement component 299 may determine whether intent data and/or entity data (and/or a component that can satisfy an intent from the intent data) are permitted by the policy 430. If the requested action (e.g., as represented in the intent data, entity data, component, etc.) are not permitted, then an error message may be generated and output to the speech-detection device. One example policy 430 may restrict use of a particular speech-detection device to the hours of 9 AM-5 PM, for example.

Figure 4:
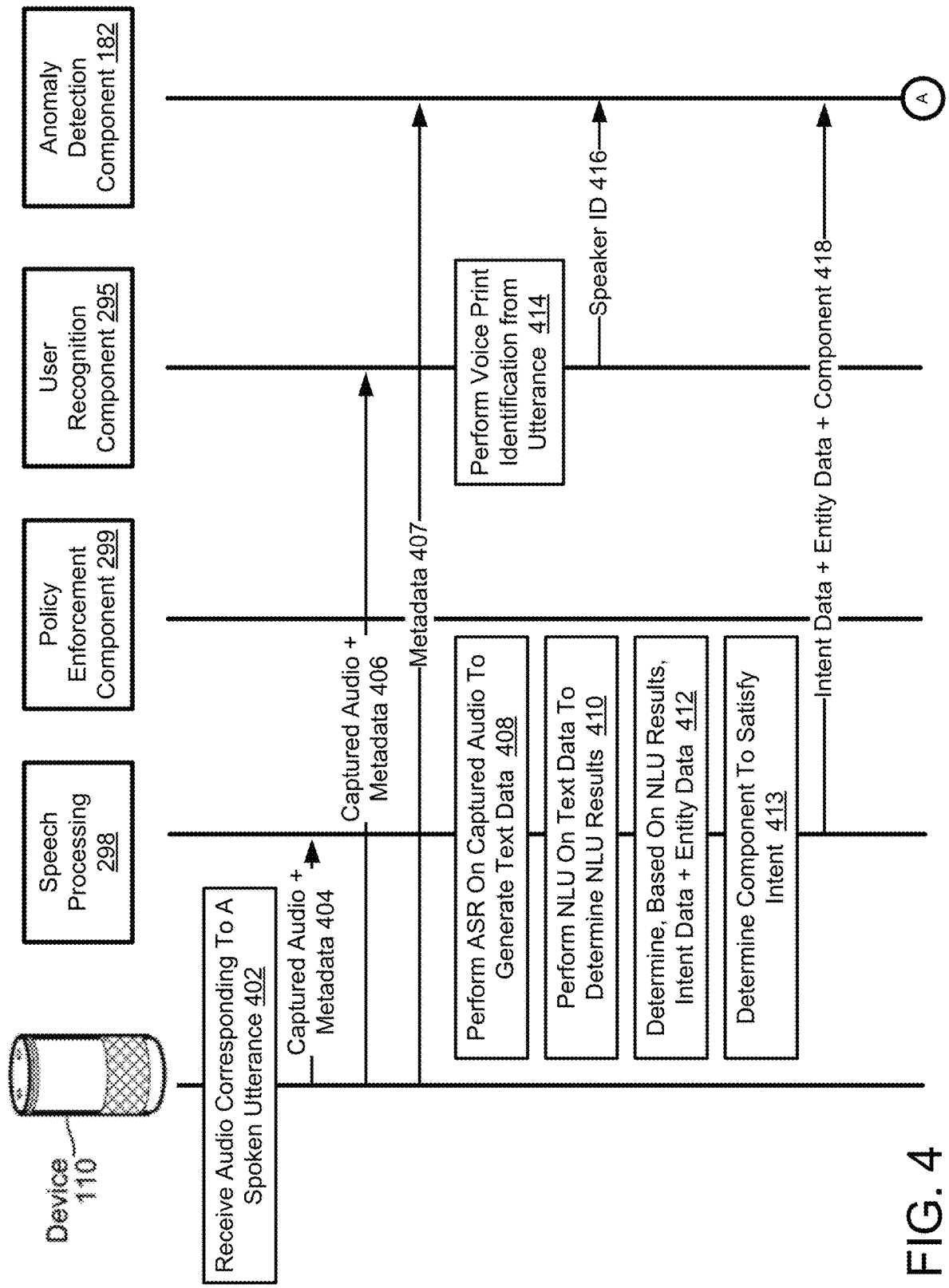
FIGS. 4-5 are sequence diagrams illustrating anomaly detection based on audio data from a speech-detection device, in accordance with embodiments of the present disclosure.
Figure 5:
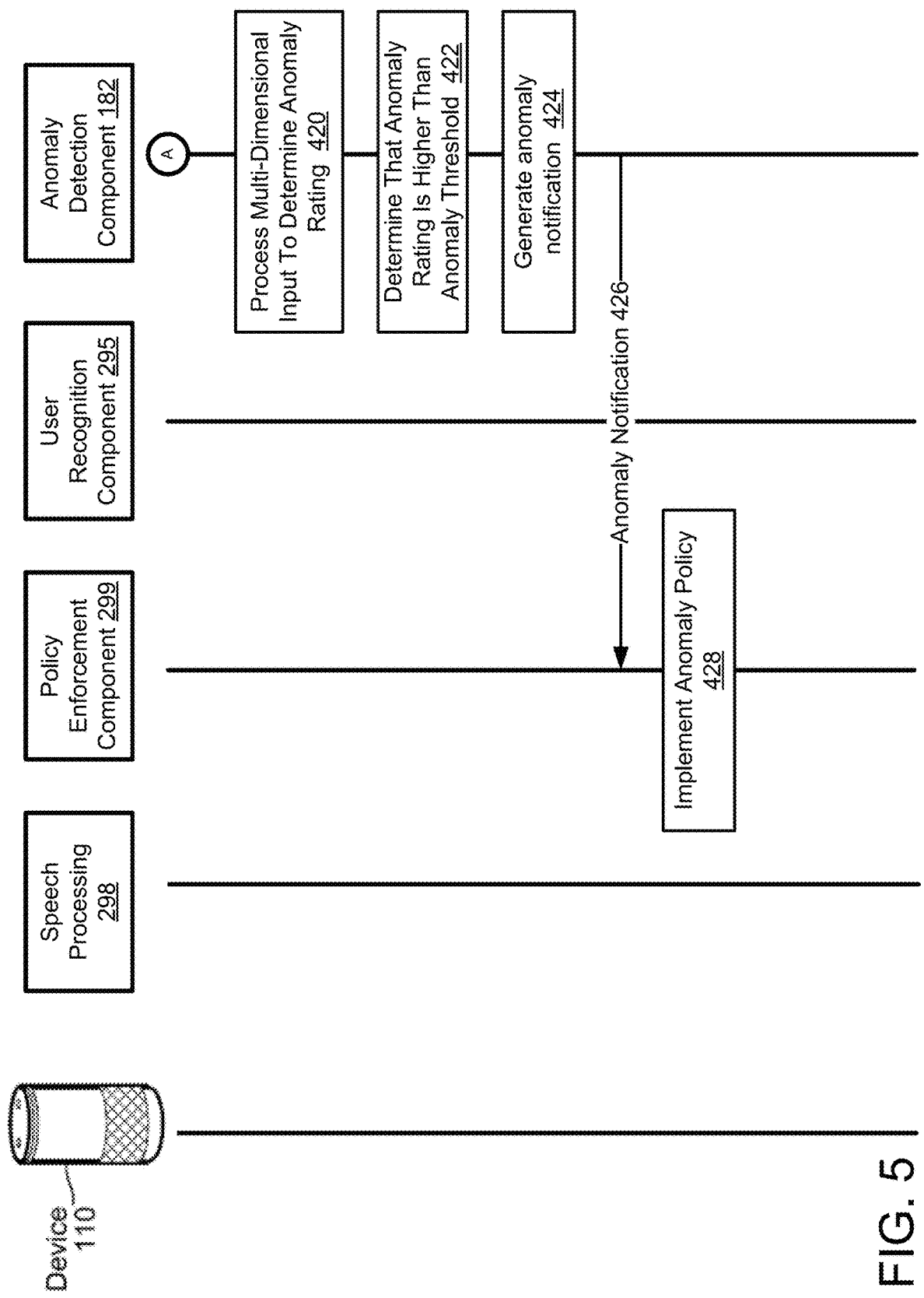

FIGS. 4-5 are sequence diagrams illustrating anomaly detection, in accordance with embodiments of the present disclosure. To initiate the sequence, device 110 receives audio corresponding to a spoken utterance from a user at block 402. The spoken utterance may include a wakeword that causes the device 110 to wake and to start sending (e.g., streaming) captured audio data and associated metadata (e.g., timestamp, location information, device ID, etc.) to a server computing device that includes speech processing component 298. Device 110 then sends the captured audio to speech processing component 298 at block 404. The captured audio and metadata may also be sent to a user recognition component 295 at block 406. The metadata may also be sent to an anomaly detection component 182 at block 407.

At block 408 the speech processing component 298 performs ASR on the captured audio to generate text data (e.g., to generate text data comprising the text, "Katy Perry"). The speech processing component 298 transcribes the captured audio data into text data representing words of speech contained in the audio data. In some embodiments, a spoken utterance in the audio data is input to a processor configured to perform ASR, which then interprets the spoken utterance based on a similarity between the spoken utterance and pre-established language models stored in an ASR model knowledgebase. For example, the speech processing component 298 may compare the audio data with models for sounds (e.g., subword units and/or phonemes) and sequences of sounds to identify words that match the sequence of sounds spoken in the utterance of the audio data.

At block 410, the speech processing component 298 performs NLU on the text data to determine NLU results. In some embodiments, speech processing component 298 takes text data and attempts to make a semantic interpretation of the text data. That is, the speech processing component 298 determines the meaning behind the text data based on the individual words. The speech processing component 298 interprets a text string to derive an intent data and/or a desired action as well as the pertinent pieces of information in the text data (e.g., entity data associated with the intent data) that enable the desired action to be completed.

To correctly perform NLU processing of an utterance, the speech processing component 298 may determine one or more "domain" of the utterance so as to determine and narrow down which components may be relevant. Text data for an utterance may be processed applying the rules, models, and information applicable to each identified domain. For example, if text data potentially implicates both news and music, the text data may be NLU processed using the grammar models and lexical information for news, and may also be processed using the grammar models and lexical information for music. The responses to the text data associated with the spoken utterance produced by each set of models is scored, with the overall highest ranked result from all applied domains being ordinarily selected to be the correct result. Alternatively, multiple highest ranked results may be selected.

At block 412 the speech processing component 298 may determine, based on the NLU results, intent data and entity data. In some embodiments, speech processing component 298 parses the text data to determine intent data for each identified domain, where the intent data corresponds to the action to be performed that is responsive to the spoken utterance. The speech processing component 298 may identify potential intents for each identified domain by comparing words in the utterance to the words and phrases in an intents database. The entity data and/or entity data may include an indication (e.g., a component ID) of a component that can satisfy an intent represented by the intent data (or represented by a combination of the intent data and the entity data).

At block 413, speech processing component 298 may determine a component that can satisfy a user intent represented by the intent data, or by a combination of the intent data and the entity data. For example, a music component may be determined if the intent is "play music" and the entity data is "album Back in Black". Alternatively, the intent data may be associated with a specific component and/or command processor, and a separation determination of the component that will satisfy the intent is not performed.

At block 418, the speech processing component sends the intent data, the entity data and/or an identifier (e.g., component ID) of the determined component that can satisfy the user intent to anomaly detection component 182.

At block 414, user recognition component 295 performs voice print identification from the utterance to determine a speaker ID associated with a user who voiced the utterance. At block 416, the user recognition component 295 may send the speaker ID to the anomaly detection component 182.

At block 420, the anomaly detection component 420 processes a multi-dimensional input that includes the metadata from block 407, the speaker ID from block 416 and/or the intent data, entity data and/or component ID from block 418. The anomaly detection component 182 may process the multi-dimensional input by inputting it into one or more machine learning models that have been trained to classify inputs as anomalous or not anomalous and/or to assign anomaly ratings to inputs. The machine learning model may output an anomaly rating associated with the spoken utterance received at block 402. At block 422, the anomaly detection component 182 determines that the anomaly rating is higher than an anomaly threshold, which may indicate that the input has been classified as an anomaly. At block 424, the anomaly detection component may generate an anomaly notification. At block 426, the anomaly detection component may send the anomaly notification to the policy enforcement component 299. The anomaly notification may include the multi-dimensional input or a portion of the multi-dimensional input (e.g., a speaker ID and/or device ID).

At block 428, the policy enforcement component 299 implements an enforcement policy associated with the speaker ID and/or the device ID. This may include generating an anomaly notification for a user and/or administrator, placing the device 110 into a lockdown mode, placing the user on a blacklist, and so on.

Figure 6:
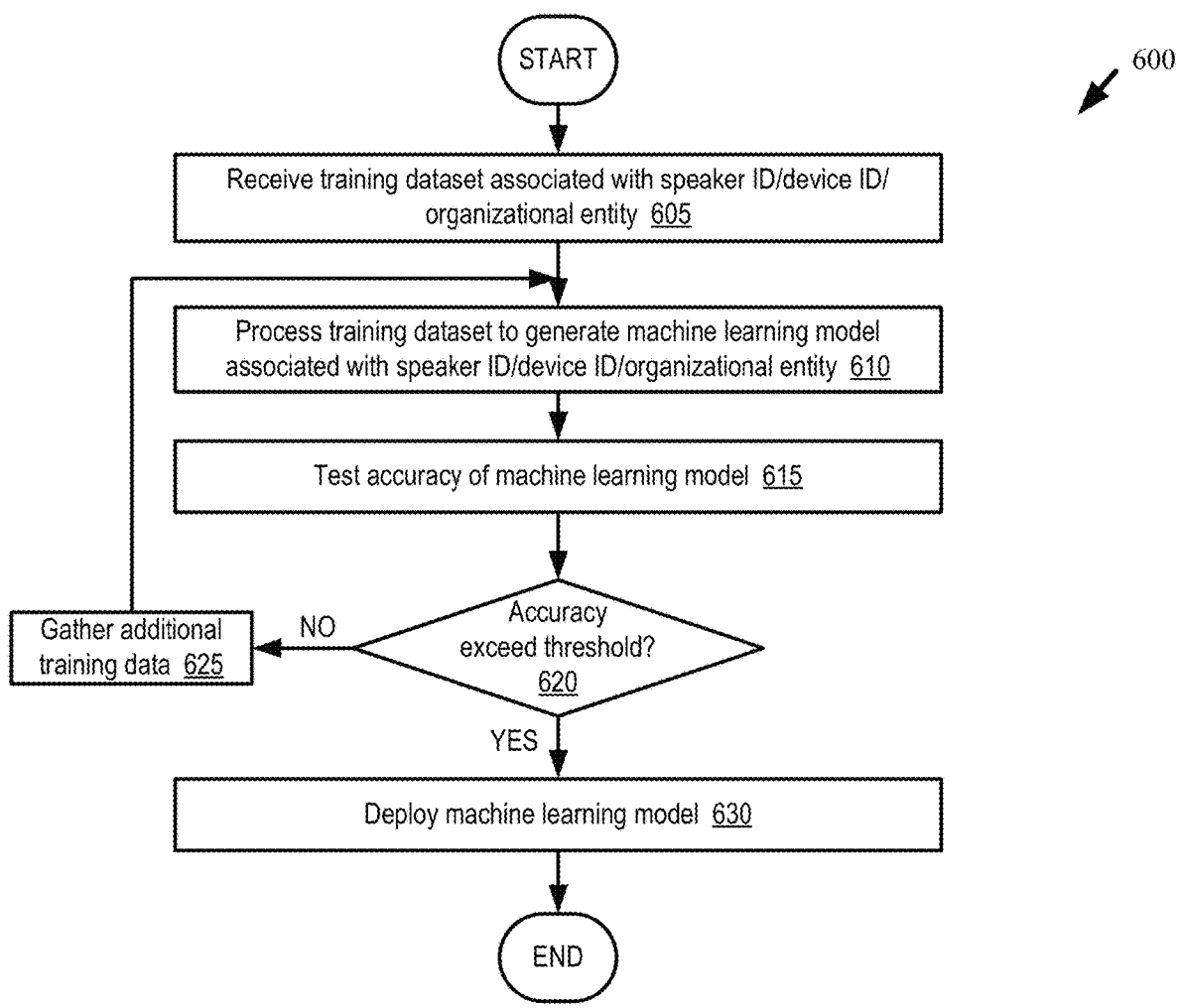
FIG. 6 is a flow diagram illustrating a method for generating a machine learning model used to perform anomaly detection according to embodiments of the present disclosure.
Figure 7:
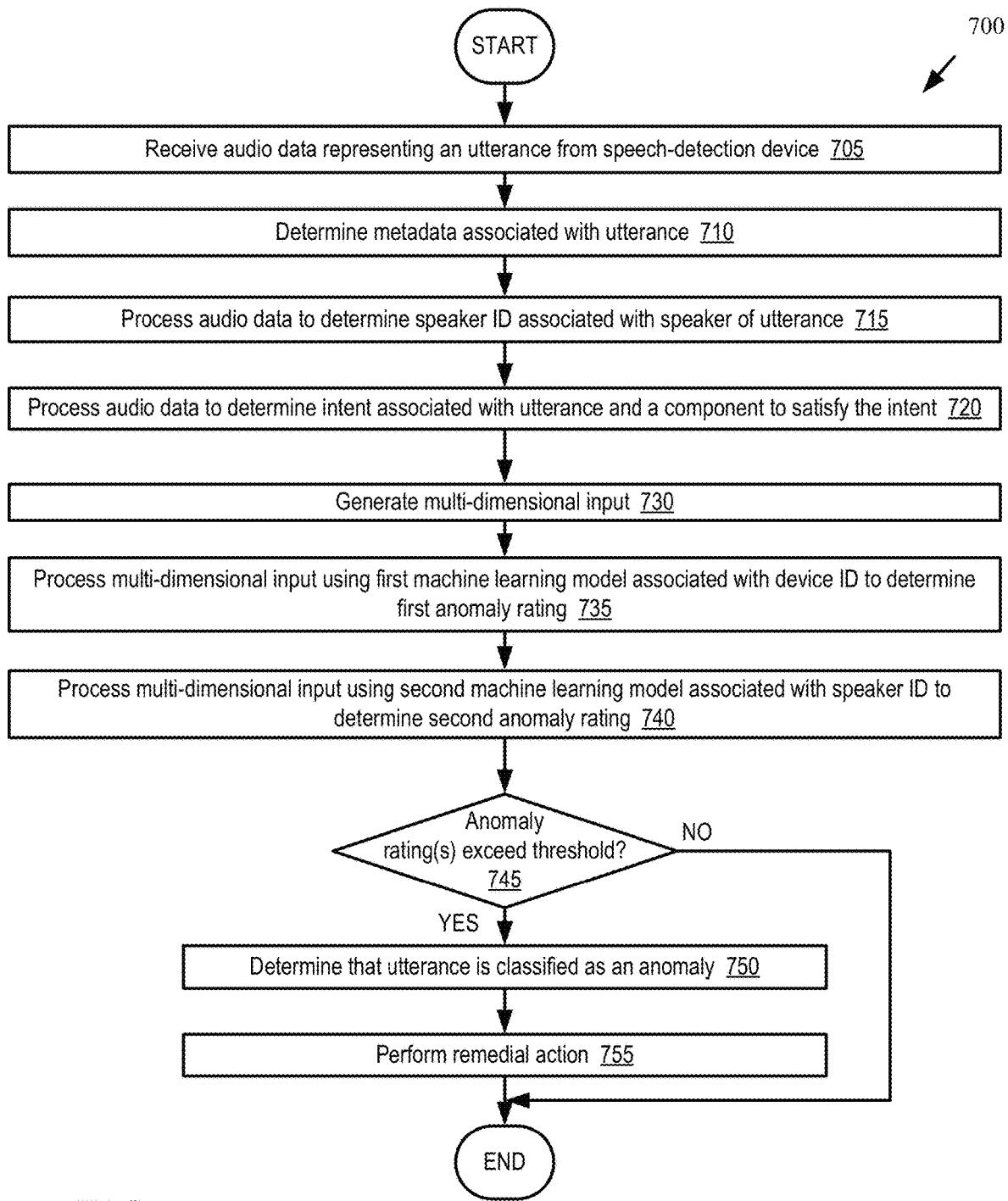
FIG. 7 is a flow diagram illustrating a method for performing anomaly detection using a machine learning model according to embodiments of the present disclosure.
Figure 8:
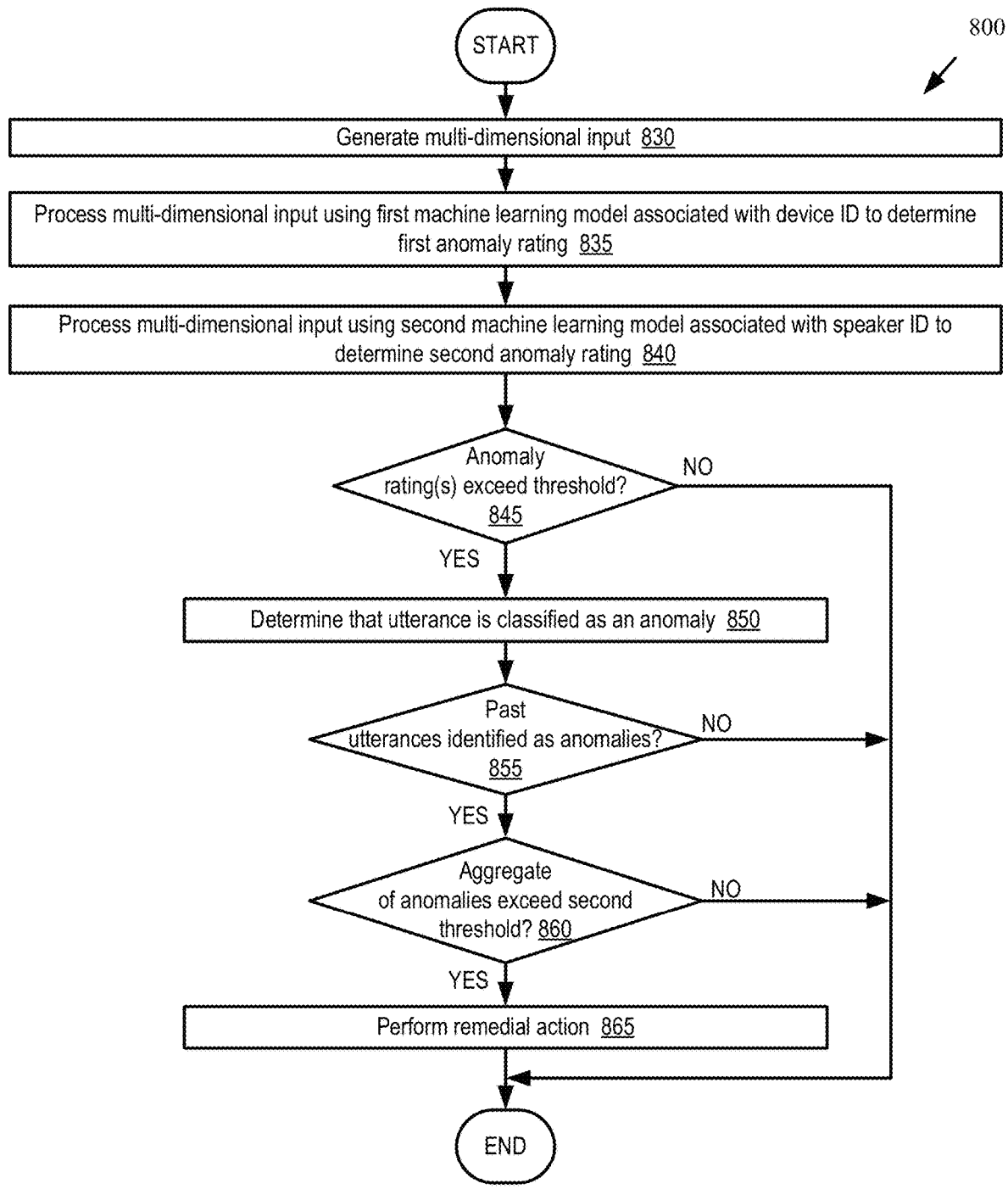
FIG. 8 is a flow diagram illustrating a method for performing anomaly detection using a machine learning model according to embodiments of the present disclosure.

FIGS. 6-8 are flow diagrams illustrating methods 600, 700, 800 associated with generating machine learning models for anomaly detection and applying such machine learning models to perform anomaly detection according to embodiments of the present disclosure. The methods 600, 700, 800 may be performed by a processing logic that may comprise hardware (e.g., circuitry, dedicated logic, programmable logic, microcode, etc.), software (e.g., instructions run on a processing device to perform hardware simulation), or a combination thereof. In some embodiments, at least some operations of methods 600, 700 and/or 800 are performed by an anomaly detection component 182 executed by one or more server(s) 120a-n.

For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram and/or events.

FIG. 6 is a flow diagram illustrating a method 600 for generating a machine learning model used to perform anomaly detection according to embodiments of the present disclosure. At block 605 of method 600, processing logic receives a training dataset associated with a speaker ID, a device ID or an organizational entity (e.g., a business, a group of devices owned by a business that share a common property, and so on). At block 610, processing logic processes the training dataset to generate a machine learning model associated with the speaker ID, the device ID or the organizational entity.

At block 615, processing logic tests an accuracy of the machine learning model. A portion of the data in the training dataset may have been set aside for testing. Such data may be classified as not anomalous since it represents past interactions associated with the speaker ID, the device ID or the organizational entity. These data points may be input into the machine learning model to determine if any of them are classified as anomalous. Those inputs classified as anomalous may be false positives. If the number of false positives exceeds a threshold, the accuracy may be below a target accuracy threshold. If so, the method continues to block 625 and additional training data is gathered. If the accuracy exceeds the accuracy threshold, then the method continues to block 630 and the machine learning model is deployed. Deployment of a machine learning model may include marking the machine learning model as active and/or storing the machine learning model in an appropriate data store.

FIG. 7 is a flow diagram illustrating a method 700 for performing anomaly detection using a machine learning model according to embodiments of the present disclosure. At block 705 of method 700, processing logic receives audio data representing an utterance from a speech-detection device. At block 710, processing logic determines metadata associated with the utterance. At block 715, processing logic processes the audio data to determine a speaker ID associated with a speaker of the utterance. At block 720, processing logic processes the audio data to determine an intent associated with the utterance (e.g., entity data and/or intent data) and/or a component ID of a component to satisfy the intent. This may include determining intent data, entity data and/or a component in embodiments.

At block 730, processing logic generates a multi-dimensional input that includes the metadata associated with the audio data (e.g., which may include a device ID of the speech-detection device), the speaker ID, the intent data, the entity data and/or a component ID for the component, and/or other information. At block 735, processing logic may process the multi-dimensional input using a first machine learning model associated with the device ID to determine a first anomaly rating for the audio data/utterance. At block 740, processing logic may process the multi-dimensional input using a second machine learning model associated with the speaker ID to determine a second anomaly rating for the audio data/utterance. In embodiments, the operations of either block 735 or block 740 may be omitted.

At block 745, processing logic determines whether one or more of the anomaly ratings exceeds an anomaly threshold. In some embodiments, different anomaly thresholds may be associated with the first machine learning model and the second machine learning model. Accordingly, processing logic may determine whether the first anomaly rating exceeds a first anomaly threshold and whether the second anomaly rating exceeds a second anomaly threshold. If the anomaly threshold(s) are exceeded by one or more of the anomaly ratings, the method continues to block 750. Otherwise the method ends.

At block 750, processing logic determines that the audio data/utterance is classified as an anomaly. At block 755, processing logic performs one or more remedial actions in response to detection of the anomaly, as discussed herein above.

If the machine learning model is an organizational machine learning model, then it may be associated with multiple difference device IDs. Accordingly, method 700 may be performed using an organizational machine learning model to determine whether first audio data received from a first speech-detection device is anomalous. Second audio data may be received from a second speech detection device and method 700 may be performed using the same organizational machine learning model that was used to determine whether the first audio data was anomalous.

In an example, the first machine learning model may be associated with the speaker ID. Additionally, previous multi-dimensional inputs in training data used to generate the first machine learning model may have been associated with a set of intents and a set of timestamps that define a time range (e.g., 9 AM-5 PM). Processing logic may determine that the multi-dimensional input comprises a new timestamp that is outside of the time range (e.g., 11 PM). Processing logic may additionally determine that the multi-dimensional input comprises a new intent that is not in the set of intents. The new timestamp and the new intent together may cause the anomaly rating to be above the anomaly threshold, and thus to be classified as an anomaly.

In another example, the first machine learning model may be associated with the device ID. Additionally, the training data used to generate the first machine learning model may be associated with a first location. Processing logic may determine that the multi-dimensional input comprises metadata identifying a second location that is different from the first location. The metadata identifying the second location may causes the first anomaly rating to be above the anomaly threshold.

FIG. 8 is a flow diagram illustrating a method 800 for performing anomaly detection using a machine learning model according to embodiments of the present disclosure. At block 830 of method 800 processing logic generates a multi-dimensional input that includes metadata associated with received audio data (e.g., which may include a device ID of a speech-detection device), a speaker ID associated with the audio data, intent data, entity data and/or a component ID determined from the audio data, and/or other information. At block 835, processing logic may process the multi-dimensional input using a first machine learning model associated with the device ID to determine a first anomaly rating for the audio data/utterance. At block 840, processing logic may process the multi-dimensional input using a second machine learning model associated with the speaker ID to determine a second anomaly rating for the audio data/utterance. In embodiments, the operations of either block 835 or block 840 may be omitted.

At block 845, processing logic determines whether one or more of the anomaly ratings exceeds an anomaly threshold. If so, the method continues to block 850. Otherwise the method ends.

At block 850, processing logic determines that the audio data/utterance is classified as an anomaly. At block 855, processing logic determines whether any past utterances associated with the user ID and/or the device ID have been identified as anomalies. If past anomalies are identified, the method continues to block 860. If no past anomalies are identified, the method ends.

At block 860, processing logic determines whether an aggregate of the currently detected anomaly and the one or more previously detected anomalies exceed a second threshold. The second threshold may be a maximum number of anomalies permitted in a time period, or a maximum number of permitted consecutive anomalies. If the second threshold is exceeded, the method continues to block 865, at which processing logic performs one or more remedial actions. If the second threshold is not exceeded, the method ends.

At block 865, processing logic performs one or more remedial actions in response to detection of the anomaly, as discussed herein above.

Figure 9:
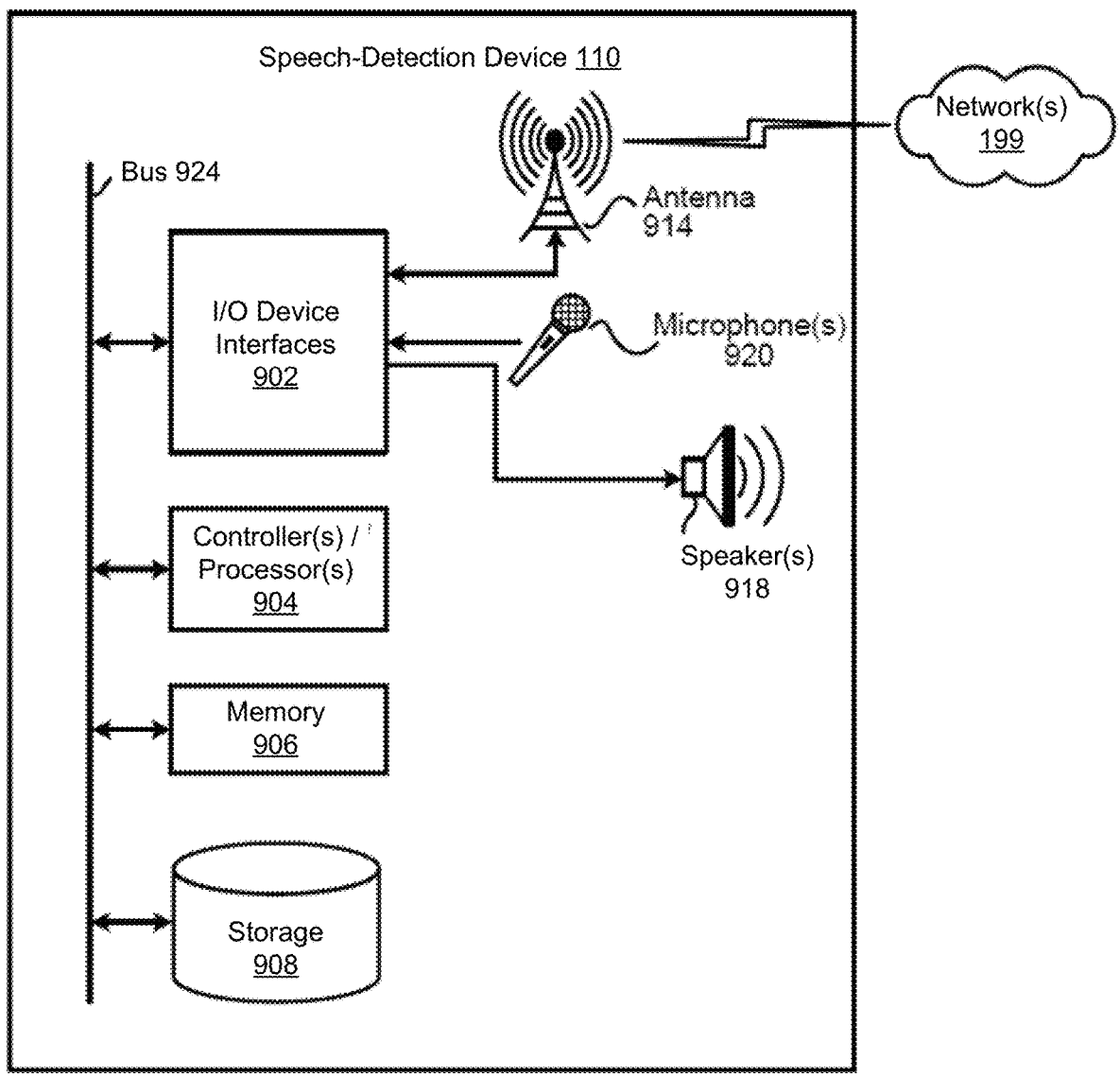
FIG. 9 is a block diagram conceptually illustrating example components of a device according to embodiments of the present disclosure.
Figure 10:
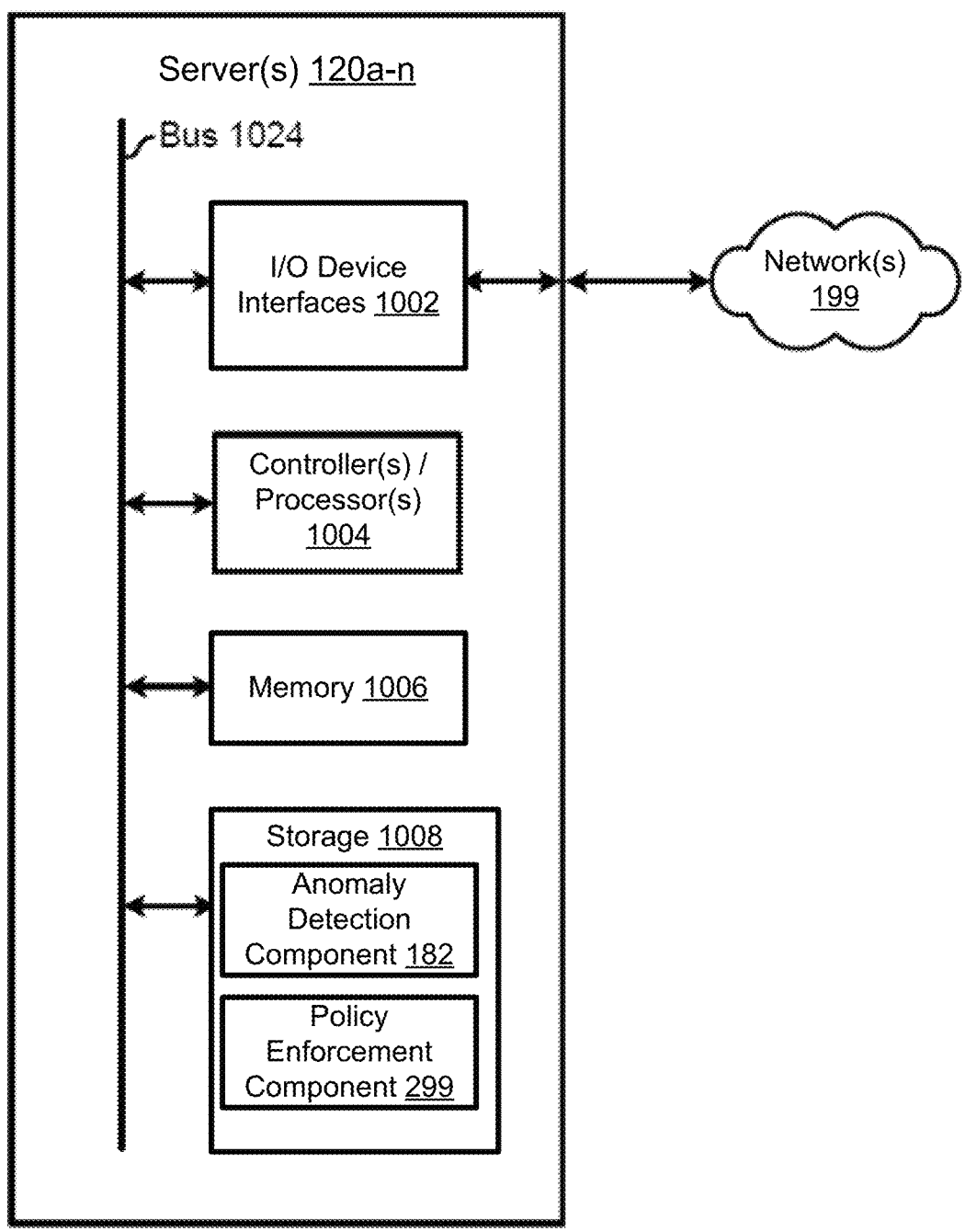
FIG. 10 is a block diagram conceptually illustrating example components of a server according to embodiments of the present disclosure.

FIG. 9 is a block diagram conceptually illustrating a speech-detection device 110, that may be used with the described system 100. FIG. 10 is a block diagram conceptually illustrating example components of a remote device, such as the server(s) 120a-n, which may assist with ASR processing, NLU processing, and/or command processing. Multiple servers 120a-n may be included in the system 100, such as one server for performing ASR, one server for performing NLU, etc. In operation, each of these devices (or groups of devices) may include computer-readable and computer-executable instructions that reside on the respective device 110, 120a-n, as will be discussed further below.

The speech-detection device 110 and servers 120a-n may include one or more controllers/processors 904, 1004, which may each include a central processing unit (CPU) for processing data and computer-readable instructions, and a memory 906, 1006 for storing data and instructions of the respective device. The memories 906, 1006 may individually include volatile random access memory (RAM), non-volatile read only memory (ROM), non-volatile magnetoresistive (MRAM), and/or other types of memory. The speech-detection device 110 and servers 120a-n may also include a data storage component 908, 1008 for storing data and controller/processor-executable instructions. Each data storage component 908, 1008 may individually include one or more non-volatile storage types such as magnetic storage, optical storage, solid-state storage, etc. Storage 1009 may include anomaly detection component 182 and/or policy enforcement component 299 in embodiments. The speech-detection device 110 and servers 120a-n may also be connected to removable and/or external non-volatile memory and/or storage (such as a removable memory card, memory key drive, networked storage, etc.) through respective input/output device interfaces 902, 1002.

Computer instructions for operating speech-detection device 110 and servers 120a-n and their various components may be executed by the respective device's controller(s)/processor(s) 904, 1004, using the memory 906, 1006 as temporary "working" storage at runtime. A device's computer instructions may be stored in a non-transitory manner in non-volatile memory 906, 1006, storage 908, 1008, and/or an external device(s). Alternatively, some or all of the executable instructions may be embedded in hardware and/or firmware on the respective device in addition to or instead of software.

The speech-detection device 110 and servers 120a-n each includes input/output device interfaces 902, 1002. A variety of components may be connected through the input/output device interfaces 902, 1002, as will be discussed further below. Additionally, speech-detection device 110 and servers 120a-n may include an address/data bus 924, 1024 for conveying data among components of the respective device. Each component within a speech-detection device 110 and servers 120a-n may also be directly connected to other components in addition to (or instead of) being connected to other components across the bus 924, 1024.

Referring to FIG. 9, the speech-detection device 110 may include input/output device interfaces 902 that connect to a variety of components such as an audio output component such as a speaker(s) 918, a wired headset and/or a wireless headset (not illustrated), and/or other component capable of outputting audio. The speech-detection device 110 may also include an audio capture component. The audio capture component may be, for example, a microphone 920 or array of microphones, a wired headset and/or a wireless headset (not illustrated), etc. The microphone(s) 920 may be configured to capture audio. If an array of microphones 918 is included, approximate distance to a sound's point of origin may be determined by acoustic localization based on time and amplitude differences between sounds captured by different microphones of the array.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system 100 may be distributed across a networked environment.

As noted above, multiple devices may be employed in a single speech processing system 100. In such a multi-device system, each of the devices may include different components for performing different aspects of the speech processing. The multiple devices may include overlapping components. The components of the speech-detection device(s) 110 and the server(s) 120a-n, as illustrated in FIGS. 9 and 10, are exemplary, and may be located as a stand-alone device and/or may be included, in whole or in part, as a component of a larger device and/or system.

As illustrated in FIG. 11, multiple devices (110-110e, 120a-n) may contain components of the system 100 and the devices may be connected over a network(s) 199. The network(s) 199 may include a local and/or private network and/or may include a wide network such as the Internet. Devices may be connected to the network(s) 199 through either wired and/or wireless connections. For example, a speech-detection device 110, a smart phone 110b, a smart watch 110c, a tablet computer 110d, and/or a vehicle 110e may be connected to the network(s) 199 through a wireless component provider, over a Wi-Fi and/or cellular network connection, or the like. Other devices are included as network-connected support devices, such as the server(s) 120a-n, or others. The support devices may connect to the network(s) 199 through a wired connection and/or wireless connection. Networked devices may capture audio using one-or-more built-in and/or connected microphones and/or audio capture devices, with processing performed by ASR, NLU, and/or other components of the same device and/or another device connected via the network(s) 199, such as the ASR component 250, the NLU component 260, the anomaly detection component 198, etc. of one or more servers 120a-n.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The non-transitory computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
   receiving, by a speech-processing system and from a speech-detection device, audio data representing an utterance;
   determining metadata associated with the utterance, the metadata comprising at least one of a device identifier (ID) of the speech-detection device, a timestamp, or a location of the speech-detection device;
   processing the audio data to determine a speaker ID associated with a speaker of the utterance;
   processing the audio data to determine an intent associated with the utterance and a component to satisfy the intent, wherein the component provides one or more function to the speech-processing system;
   generating a multi-dimensional input comprising the metadata, the speaker ID, the intent, and a component ID of the component;
   processing the multi-dimensional input using a first machine learning model associated with the device ID to determine a first anomaly rating associated with the utterance;
   determining that the first anomaly rating is above a first anomaly threshold;
   determining that the utterance is classified as an anomaly; and
   disabling one or more features for the speech-detection device.

2. The computer-implemented method of claim 1, further comprising:
   processing the multi-dimensional input using a second machine learning model associated with the speaker ID to determine a second anomaly rating; and
   determining that the second anomaly rating is above the first anomaly threshold or a second anomaly threshold.

3. The computer-implemented method of claim 1, further comprising:
   determining that one or more previous utterances were also classified as anomalies; and
   determining that a threshold number of utterances received by the speech-detection device have been classified as anomalies.

4. A computer-implemented method comprising:
   receiving a multi-dimensional input associated with audio data representing an utterance received by a speech-detection device, the multi-dimensional input comprising a speaker identifier (ID) of a speaker of the utterance and a device ID of the speech-detection device;
   processing the multi-dimensional input using a first machine learning model associated with at least one of the device ID or the speaker ID to determine a first anomaly rating for the utterance;
   determining that the first anomaly rating is above a first anomaly threshold;
   determining that the utterance is classified as an anomaly; and
   disabling one or more features for the speech-detection device.

5. The computer-implemented method of claim 4, wherein the first machine learning model is associated with the speaker ID and wherein previous multi-dimensional inputs in training data used to generate the first machine learning model were associated with a set of intents and a set of timestamps that define a time range, the method further comprising:
   determining that the multi-dimensional input comprises a new timestamp that is outside of the time range; and
   determining that the multi-dimensional input comprises a new intent that is not in the set of intents;
   wherein the new timestamp and the new intent together cause the first anomaly rating to be above the anomaly threshold.

6. The computer-implemented method of claim 4, further comprising:
   receiving, from the speech-detection device, audio data representing the utterance; and
   determining metadata associated with the utterance, the metadata comprising a timestamp, the device ID and a location of the speech-detection device.

7. The computer-implemented method of claim 6, further comprising:
   processing the audio data to determine the speaker ID associated with the speaker of the utterance; and
   processing the audio data to determine an intent associated with the utterance and a component to satisfy the intent, wherein the multi-dimensional input further comprises the intent and a component ID for the component.

8. The computer-implemented method of claim 4, wherein the first machine learning model is associated with the device ID and wherein training data used to generate the first machine learning model was associated with a first location, the method further comprising:
   determining that the multi-dimensional input comprises metadata identifying a second location that is different from the first location, wherein the metadata identifying the second location causes the first anomaly rating to be above the anomaly threshold.

9. The computer-implemented method of claim 4, wherein the first machine learning model is associated with the device ID, the method further comprising:
   processing the multi-dimensional input using a second machine learning model associated with the speaker ID to determine a second anomaly rating; and
   determining that the second anomaly rating is above the first anomaly threshold or a second anomaly threshold.

10. The computer-implemented method of claim 4, further comprising:
    determining that one or more previous utterances were also classified as anomalies; and
    determining that a threshold number of utterances received by the speech-detection device have been classified as anomalies.

11. The computer-implemented method of claim 4, wherein the first machine learning model is associated with an organization that controls a plurality of speech-detection devices, the method further comprising:
    receiving an additional multi-dimensional input associated with additional audio data representing an additional utterance received by a second speech-detection device of the plurality of speech-detection devices;

processing the additional multi-dimensional input using the first machine learning model to determine a second anomaly rating associated with the additional utterance; and determining whether the second anomaly rating is above the first anomaly threshold.

12. A system comprising:

at least one processor; and at least one memory including instructions that, when executed by the at least one processor, cause the at least one processor to:

receive a multi-dimensional input associated with audio data representing an utterance received by a speech-detection device, the multi-dimensional input comprising a speaker identifier (ID) of a speaker of the utterance and a device ID of the speech-detection device;

process the multi-dimensional input using a first machine learning model associated with at least one of the device ID or the speaker ID to determine an anomaly classification for the utterance;

determine that the utterance is classified as an anomaly; and disable one or more features for the speech-detection device.

13. The system of claim 12, wherein the first machine learning model generates an anomaly rating for the multi-dimensional input, and wherein the instructions, when executed by the at least one processor, further cause the at least one processor to:

determine that the anomaly rating is above a first anomaly threshold.

14. The system of claim 12, wherein the instructions, when executed by the at least one processor, further cause the at least one processor to receive authentication credentials associated with the device ID; and enable the one or more features.

15. The system of claim 12, wherein the instructions, when executed by the at least one processor, further cause the at least one processor to:

receive, from the speech-detection device, audio data representing the utterance; and determine metadata associated with the utterance, the metadata comprising a timestamp, the device ID and a location of the speech-detection device.

16. The system of claim 15, wherein the instructions, when executed by the at least one processor, further cause the at least one processor to:

process the audio data to determine the speaker ID associated with the speaker of the utterance; and process the audio data to determine an intent associated with the utterance and a component to satisfy the intent, wherein the multi-dimensional input further comprises the intent and a component ID for the component.

17. The system of claim 13, wherein the first machine learning model is associated with the device ID, and wherein the instructions, when executed by the at least one processor, further cause the at least one processor to:

process the multi-dimensional input using a second machine learning model associated with the speaker ID to determine a second anomaly rating; and determine that the second anomaly rating is above the first anomaly threshold or a second anomaly threshold.

18. The system of claim 12, wherein the instructions, when executed by the at least one processor, further cause the at least one processor to:

determine that one or more previous utterances were also classified as anomalies; and determine that a threshold number of utterances received by the speech-detection device have been classified as anomalies.

19. The computer-implemented method of claim 4, further comprising:

placing the speech-detection device in a lockdown mode.

20. The system of claim 12, wherein the instructions, when executed by the at least one processor, further cause the at least one processor to:

place the speech-detection device in a lockdown mode.

* * * * *